UNITED STATES PATENT OFFICE.

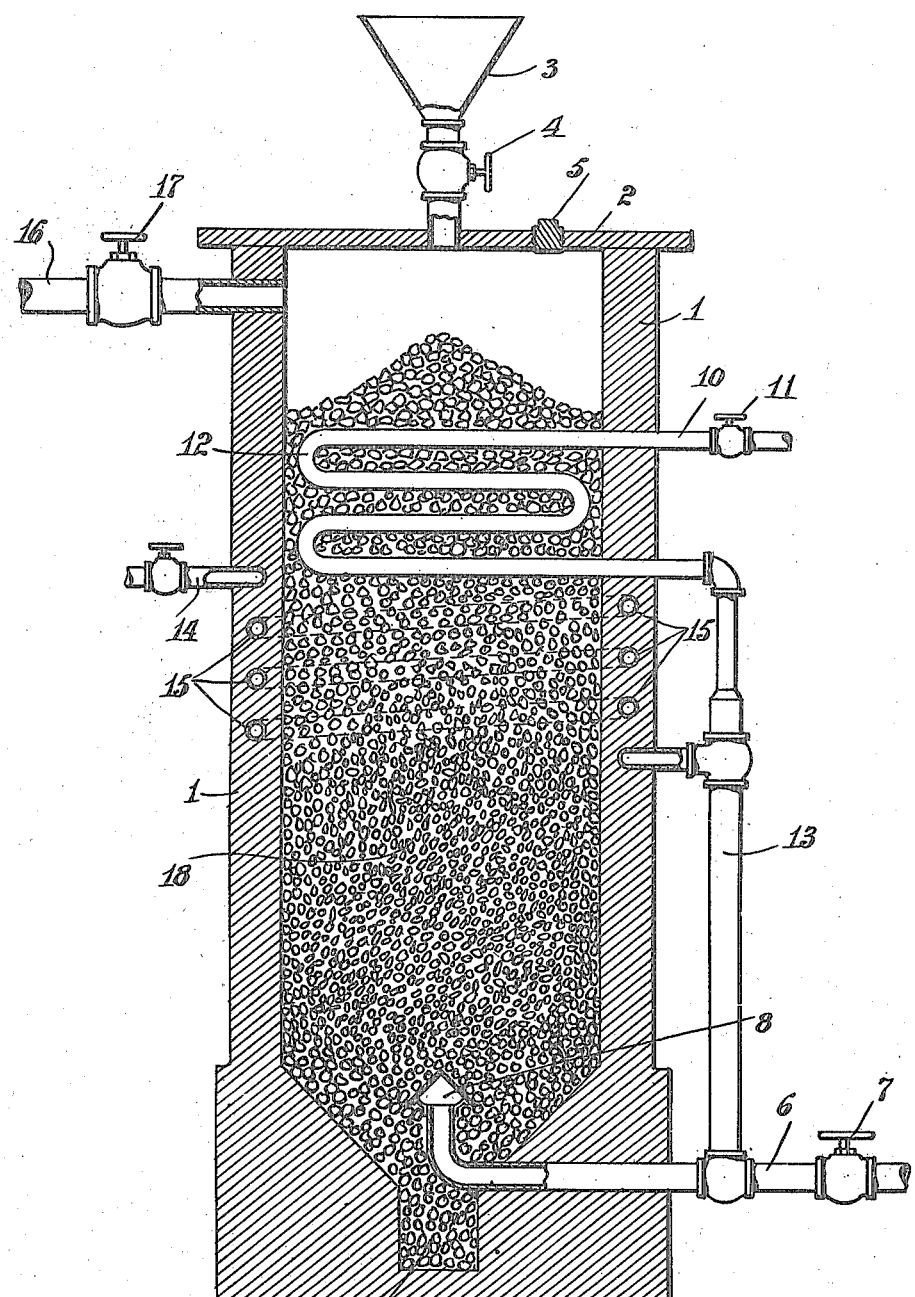

CARLETON ELLIS, OF MONTCLAIR, NEW JERSEY, ASSIGNOR TO ELLIS-FOSTER COMPANY, A CORPORATION OF NEW JERSEY.

PROCESS OF MAKING NITRIC ACID FROM AMMONIA.

1,233,564.      Specification of Letters Patent.     Patented July 17, 1917.

Application filed October 12, 1916. Serial No. 125,156.

*To all whom it may concern:*

Be it known that I, CARLETON ELLIS, a citizen of the United States, and a resident of Montclair, in the county of Essex and State of New Jersey, have invented certain new and useful Improvements in Processes of Making Nitric Acid from Ammonia, of which the following is a specification.

This invention relates to a method of oxidizing ammonia to form oxids of nitrogen, nitrous and nitric acids and the like and relates particularly to a process adapted for utilization in large scale operation whereby catalytic material may be used effectively with such control and under such conditions of operation as to secure large output, etc.

In the oxidation of ammonia by air in order to produce nitric acid on a basis competitive with that obtained from Chile saltpeter, it becomes necessary to start with a low grade of ammonia such as that contained in gas liquors, to cheaply extract this ammonia and with the removal of the minimum amount of impurities to mix the ammonia with air and pass same into contact with catalytic material capable of bringing about the conversion of the ammonia to nitrogen oxids. Starting, for example, with crude gas liquors the ammonia may be expelled by the passage of air therethrough while the liquor is being suitably heated and the moist ammonia mingled with air may then be subjected to the oxidation stage. The gas liquors may be freed from their ammonia by treatment by a counter-current system with air extraction. Any suitable arrangement of tanks or towers can be used for the purpose. Or a single tower vaporizer may be employed in which are suitable steam pipes for heating while the ammonia liquor is sprayed into the top of the apparatus and withdrawn at the bottom. A current of air is passed into the vaporizer at the lower part and takes up the ammonia. The hot gases and vapors are withdrawn at the top. The hot or warm current passing out of the vaporizing tower may, if desired, pass through a heat interchanger for the purpose of warming up the gas liquors entering the apparatus. The ammonia gas and air may then be led to a purifier consisting of a series of washers or scrubbers, in one or more of which ammoniacal water may be used and in the others milk of lime. The latter removes carbon dioxid, sulfur and other impurities. Such a purifier may take the form of a tower into which a slow stream of milk of lime is entered in the upper part and the waste liquors or sludge withdrawn at the bottom. The impure ammonia vapors and air enter the lower part of the tower and are withdrawn in a purified state at the top. From here the current may pass to a drier or to a refrigerator which by chilling the air and ammonia precipitates the major portion of the moisture which is removed. As this condensate is saturated with ammonia it may be returned to the vaporizer, if desired, or otherwise used. The foregoing purification and drying while required in some cases may be dispensed with when using certain catalytic material. Platinum, for example, as a catalytic agent is quite sensitive to impurities and has to be frequently renewed. Unless the ammonia is purified with great care a coating of impurities forms over the surface of the platinum quickly rendering it inert. In the present invention such purifying and drying apparatus is not required ordinarily, although these appurtenances may be employed in some cases.

The ammonia and air mixture obtained in this way if not in the correct proportions for satisfactory oxidation may be mixed with additional air to produce the correct mixture and conveyed to the converting chamber in which oxidation of the ammonia takes place by virtue of contact with the catalytic material.

This catalytic chamber consists preferably of a shaft which permits of the placing of the catalytic material in the form of a preferably vertical column or bed through which the ammonia and air current may pass either upwardly or downwardly according to the arrangement of inlet and outlet pipes. The catalytic mass is preferably in the form of a coarse granular material or fragmentary body and may contain a catalytic agent supported on such material as ordinary cinder clinker, pumice stone, clay balls, fire brick and the like.

These fragments may range from small dimensions, considerably less than one inch in diameter to several inches in diameter depending upon the velocity of the air current desired and other conditions.

By reference to the accompanying diagrammatic or illustrative drawing a converter constructed to carry out the process of the present invention is shown in vertical section. This apparatus comprises a shaft, the walls of which in the present illustration are fairly thick and may be composed of refractory material which may be surrounded by a metal shell. Such a shaft is shown at 1. It is equipped with a cover 2 having a catalyzer feeding hopper 3 and valve 4. 5 is an inspection plug or poke hole. 6 is an inlet pipe for the air and ammonia mixture which is controlled by the valve 7. This pipe terminates in the twyer 8 within the mass of catalytic material 18. 9 is a pit from which the catalytic material may be withdrawn through a door or closure not shown herein. 10 is a pipe having the valve 11 which pipe connects with the coil 12 placed within the shaft 1, preferably as shown below the surface of the catalyzer bed. The outlet pipe from this coil connects with the pipe 13 leading to the inlet pipe 6. Within the walls of the shaft is placed a coil 15, the inlet pipe to which is shown at 14 and which has suitable valve arrangements for the regulation of the flow of the gas. This coil serves to preheat the gaseous mixture entering the shaft 1. The outlet of the coil connects with the pipe 13. 16 is the outlet pipe controlled by the valve 17.

In the operation of this apparatus catalytic material of a coarse character such for example as the fragmentary material with or without a coating of some active agent such for example as the catalytic materials set forth in my pending application Serial No. 106,771 may be employed. For this purpose cobalt vanadate for example is supported on slag, cinder, asbestos or pumice may be used. Or an active material such as cobalt vanadate may be shaped into porous masses and used in that condition. The shaft 1 is well filled with the catalytic material and is suitably heated which may be done in various ways as by an oil burner or preheated air, or in other ways, the details of which need not be herein set forth. When the catalytic mass has reached a conversion temperature which may be 500 to 700° C. or thereabouts, more or less according to the nature of the catalytic agent employed, the mixture of ammonia and air is passed into the mass through the inlet pipe 6. For the purpose of adjustment of the incoming gas mixture the preheating coil 12 and also the coil 15 may be used. The distribution of the gas current through these different heating coils may be adjusted with reference to the size of the converter and the rate of flow therein. The activity of the catalyzer and other conditions will be evident from the description elsewhere given herein. By regulating the cold and preheated mixture an adjustment of proportion may be obtained to secure the best results in the oxidation of the ammonia contained therein. The coil 12 may also function as a cooling member to reduce the temperature of the upper part of the catalytic bed where the temperature may tend to rise too high, a precaution which better insures that oxidation will proceed more regularly and uniformly. With platinum it is difficult to secure more than about eighty-five per cent. conversion or so and apparently the flow of the gases must be very rapid as further oxidation ("super-oxidation") takes place very readily giving water and nitrogen as the final products. With catalytic material of the character mentioned such super-oxidation is not likely to occur and the final cooling of the upper part of the catalytic mass serves to temper the conditions advantageously. Such cooling means may however be dispensed with under certain conditions of operation. In the case of a down draft converter the relative position of the cooling coil may be reversed. Its precise location in the catalytic mass is not necessarily the point shown herein but may be varied according to conditions, such cooling member being located at any suitable point in the catalyzer mass or even throughout its mass. The coil 15 may be replaced by a hollow shell or jacket if desired, or this auxiliary cooling member may even be done away with entirely in some cases.

The heat of the reaction is considerable and while with small units it may be possible to operate without special cooling, with the larger units and the consequent reduced radiation losses per unit of catalytic mass employed, the heat evolution becomes a serious factor. The external and internal cooling methods together with the adjustment of cold and preheated air involving specific embodiments of the present invention, enable the apparatus to be kept under satisfactory control.

Of course the outgoing gases and vapors may if desired pass through a heat exchanger which may be used to preheat the entering air should conditions demand, although ordinarily such arrangement is not desirable as the satisfactory operation of the converter under normal conditions does not require, or even preclude such procedure. It may be stated that with very active catalyzer under some conditions after the catalytic bed has become heated to a working temperature the entire current of entering air and ammonia may be entered cold in order to regulate the temperature properly. Cold water may be circulated in the cooling coils.

In the condensation of the nitrous gases sufficient time should be given for the completion of oxidation of the nitrous to the nitric oxids and such completion is difficult to effect under ordinary conditions. Too sudden cooling retards the progress of oxidation to such an extent that completion of the reaction on commercial scale operation, is difficult to effect in a satisfactory manner. Too high a temperature is liable to prevent this species of oxidation because of dissociation phenomena. The cooling of the gases in the catalyzer bed before they emerge from the surface thereof gives opportunity to allow the completion of oxidation under temperature conditions of an advantageous character. The gases are in contact with a catalyzer facilitating conversion and if desired the catalyzer bed may be maintained with its upper or exit part at the temperature best adapted for finishing the oxidation of the nitrous to nitric vapors. Or a separate catalyzer chamber or converter may be employed operating at a temperature ordinarily about 100° C. and below 300° C. wherein the completion of oxidation may occur when it is desired to carry out the process to produce nitric acid.

If the gases have been well dried before entering the converter the issuing vapors contain a minimum amount of steam and the acid obtained is more concentrated than when the moist vapors are introduced. The condensation of the vapors may take place by passage through towers in contact with nitric acid which may be cooled in its passage through the towers by means of cooling pipes through which cold water flows. The absorption of the acid fumes by the acid solution takes place with some evolution of heat which retards absorption, hence the use of cooling coils for such purpose.

The catalytic material when spent in use is withdrawn at the lower part of the shaft and fresh catalytic material may be entered at the top to preserve approximately the same depth of the bed. In this manner the catalytic material may be introduced without interfering with the continuity of operation of the process and the spent catalytic material likewise removed and treated, if desired, to revivify for further use.

The foregoing description is set forth with many details purely for illustrative purposes and such details are not to be construed as limitations with respect to the scope of the invention in its broader aspects, since the essence of the invention is defined in the appended claims.

What I claim is:—

1. The process of oxidizing ammonia comprising passing a preheated mixture of dry ammonia and air through a catalyzer bed comprising fragmentary material adapted to oxidize ammonia to nitrogen oxids and in adjusting the temperature of the catalyzer bed by passing a cold mixture of ammonia and air through a conduit located within said catalyzer bed.

2. The process of oxidizing ammonia comprising passing a preheated mixture of ammonia and air through a bed of catalyzer adapted to oxidize ammonia to nitrogen oxids and in adjusting the temperature of the catalyzer bed by passing a cooler mixture of ammonia and air through a conduit located within said catalyzer bed.

3. The process of oxidizing ammonia comprising passing a mixture of dry ammonia and air through a catalyzer bed comprising coarse fragmentary material adapted to oxidize ammonia to nitrogen oxids.

4. The process of oxidizing ammonia comprising passing a mixture of dry ammonia and air into contact with catalytic material adapted to oxidize ammonia to nitrogen oxids.

5. The process of oxidizing ammonia comprising passing a preheated mixture of dry ammonia and air through a mass of catalyzer adapted to oxidize ammonia to nitrogen oxids and in adjusting the temperature of the catalyzer bed by passing a cooler mixture of ammonia and air through a conduit located within said catalyzer bed.

6. The process of oxidizing ammonia which comprises passing a mixture of ammonia and air in a direction other than horizontal through a catalyzer bed of large dimensions comprising fragmentary material adapted to oxidize ammonia to nitrogen oxids.

7. The process of oxidizing ammonia which comprises passing a mixture of ammonia and air vertically through a catalyzer bed of large dimensions comprising fragmentary material adapted to oxidize ammonia to nitrogen oxids.

8. The process of oxidizing ammonia which comprises passing a mixture of ammonia and air upwardly through a catalyzer bed of large dimensions comprising fragmentary material adapted to oxidize ammonia to nitrogen oxids.

9. The process of oxidizing ammonia which comprises passing a mixture of ammonia and an oxygen-containing gas in a direction other than horizontal through a pervious mass of catalyzer adapted to oxidize ammonia to nitrogen oxids.

10. The process of oxidizing ammonia which comprises passing a mixture of ammonia and an oxygen-containing gas vertically through a pervious mass of catalyzer adapted to oxidize ammonia to nitrogen oxids.

11. The process of oxidizing ammonia which comprises passing a mixture of ammonia and an oxygen-containing gas upwardly through a mass of catalyzer adapted to oxidize ammonia to nitrogen oxids.

12. In the process of oxidizing ammonia with air in the presence of catalytic material the process which consists in passing a mixture of ammonia and air through a mass of catalyzer, in admitting fresh catalyzer to the upper part of said mass and in withdrawing the spent catalytic material from the lower part thereof.

13. In the process of oxidizing ammonia with an oxygen containing gas in the presence of catalytic material the step which consists in passing a mixture of ammonia and such gas vertically through a bed of pervious catalytic material, in admitting fresh catalyzer to the upper part of said bed and in withdrawing the spent catalytic material from the lower part thereof.

14. In the process of oxidizing ammonia with air in the presence of catalytic material the step which consists in passing a mixture of ammonia and air upwardly through a bed of coarse fragmentary catalytic material, in admitting fresh catalyzer to the upper part of said bed and in withdrawing the spent catalytic material from the lower part thereof.

15. In the process of oxidizing ammonia with air in the presence of catalytic material the step which consists in passing a dry mixture of ammonia and air through a pervious bed of catalytic material, in admitting fresh catalyzer to the upper part of said bed and in withdrawing the spent catalytic material from the lower part thereof.

16. The process of oxidizing ammonia which comprises passing a mixture of dry ammonia and air through a catalyzer bed adapted to oxidize ammonia to nitrous oxids and in adjusting the temperature of the catalyzer bed by internal cooling.

17. The process of oxidizing ammonia which comprises passing a mixture of dry ammonia and air upwardly through a catalyzer bed adapted to oxidize ammonia to nitrous oxids and in adjusting the temperature in the upper part of the catalyzer bed by internal cooling.

18. The process of oxidizing ammonia which comprises passing a mixture of ammonia and air through a catalyzer bed comprising coarse fragmentary material adapted to oxidize ammonia to nitrous oxids and in adjusting the temperature of the catalyzer bed by internal cooling.

19. The process of oxidizing ammonia which comprises passing a mixture of ammonia and an oxygen containing gas through a catalyzer bed comprising material adapted to oxidize ammonia to nitrous oxids and in adjusting the temperature in part at least of the catalyzer bed by a cooling agent capable of effecting a temperature adjustment irrespective of the temperature of the external air.

20. In the process of oxidizing ammonia by air in the presence of catalytic material, the step which comprises carrying out the major portion of the oxidation at a relatively high temperature and in substantially completing the oxidation at a lower temperature in the presence of catalytic material.

21. In the process of oxidizing ammonia by oxygen in the presence of catalytic material, the step which comprises carrying out a portion of the oxidation at a relatively high temperature and in substantially completing the oxidation at a lower temperature in the presence of catalytic material.

22. In the process of oxidizing ammonia by air in the presence of catalytic material, the step which comprises carrying out the initial portion of the oxidation at a relatively high temperature and in further oxidizing at a lower temperature in the presence of catalytic material.

23. In the process of oxidizing ammonia by air in the presence of a mass of catalytic material, the step which comprises carrying out the oxidation at temperatures progressively lowered with the progress of the gas mixture through the catalytic mass.

CARLETON ELLIS.